United States Patent [19]

Kramer

[11] 4,391,664

[45] Jul. 5, 1983

[54] PROCESS FOR FIXING TILES IN POSITION

[75] Inventor: Wilhelm Kramer, Linz, Fed. Rep. of Germany

[73] Assignee: Schmelzbasaltwerk Kalenborn, Dr. Ing. Mauritz KG, Kalenborn bei Linz, Fed. Rep. of Germany

[21] Appl. No.: 183,228

[22] Filed: Sep. 2, 1980

[30] Foreign Application Priority Data

Feb. 26, 1980 [DE] Fed. Rep. of Germany ....... 3007147

[51] Int. Cl.³ .......................... E04B 2/00; B05D 5/12
[52] U.S. Cl. ...................................... 156/71; 156/297; 156/299; 156/330; 427/221; 428/49; 428/416; 252/511; 156/276
[58] Field of Search ................. 156/71, 276, 297, 298, 156/299, 330; 52/420, 389, 309.5, 309.17, 747; 429/195, 221, 410; 428/78, 414, 416, 454, 49; 252/511

[56] References Cited

U.S. PATENT DOCUMENTS

| | | | |
|---|---|---|---|
| 3,212,946 | 10/1965 | Weller et al. | 156/71 |
| 3,271,222 | 9/1966 | Moorman | 9/6 P |
| 3,439,076 | 4/1969 | Loois | 52/309.17 |

FOREIGN PATENT DOCUMENTS

| | | | |
|---|---|---|---|
| 2637223 | 2/1978 | Fed. Rep. of Germany | 156/71 |
| 1584006 | 2/1981 | United Kingdom | 156/71 |

*Primary Examiner*—Edward C. Kimlin
*Assistant Examiner*—F. K. Wine
*Attorney, Agent, or Firm*—Balogh, Kramer, Osann, Dvorak, Genova & Traub

[57] ABSTRACT

A process for fixing wear-resistant armoring tiles to cement mortar. In accordance with the process, the back sides of the tiles are coated with a mixture of polyester epoxy resin composition including sand and quartz or sand powder, with a curing agent. A material having an affinity for the cement mortar (like quartz sand or lavalite) is dusted and rolled into the coated back side of the tiles, so as to thoroughly be mixed up with the resin mixture coating. After the hardening of the coating including the material having affinity to cement mortar, the tiles are embedded in the cement mortar. Accordingly, this process substantially eliminates the well known poor adhesive properties of such tiles with respect to cement mortar.

6 Claims, No Drawings

PROCESS FOR FIXING TILES IN POSITION

BACKGROUND OF THE INVENTION

The invention relates to a process for fixing tiles (in position) which have poor adhesive properties with respect to cement mortar, and more specially to wear-resistant lining tiles of ceramic, fused mineral or metallic material, for highly abrasive bulk material such as coal, ores and rock.

Such tiles, which may have highly wear-resistant properties for example, are generally made up of high-alloy, alloy or plain steel, cast iron plates, fused tiles or other bodies, generally made up of mineral or ceramic material for producing highly wear-resistant properties. They are bedded in cement mortar and are generally used for armoring and lining structures for stopping wear by abrasion and by impact. Fields of use in this respect are for example straight or coiled chutes, which may be part of bunker systems above and underground for storing and transporting bulk material.

Metallic armoring or wear-resistant tiles for bulk materials, for example in the case of coiled chutes underground, not only have to be very highly wear-resistant and hard, but furthermore it is necessary for them to be fixed mechanically as strongly as possible to the supporting structure in which they are bedded. Because of the high hardness, it will readily be seen that every impact will directly take effect on the supporting structure, which will be acted upon by specially high forces. If the armoring tiles are not fixed to the supporting structure strongly enough, they will be broken off without wearing, that is to say they will no longer be in a position of undertaking their desired function.

Because of the general increase in costs from year to year, harder and harder materials have been put to use for tiles. An important property of these very hard materials is, however, that their chemical nature is such that they have a low level of, or no adhesion with respect to cement mortar. For this reason, those in the art have been forced to take the step of fixing such tiles in place by using high-price epoxy resin or polyester resin or the like based plastics materials, whose processing is hard to undertake. Such resins have a very high price and there are a number of shortcomings in connection with working the materials on fixing the tiles in place. In addition, on such fixing of the tiles, trouble conditions are caused by electrostatic charging on placing electrically conducting tiles in electrically conducting fixing compositions. This question is furthermore gone into in the German patent application No. P 26 37 223.6.

SHORT ACCOUNT OF THE INVENTION

One purpose of the present invention is that of making it possible for tiles of very hard materials, which have a high degree of adhesion with respect to plastic mortars, as needed for this purpose (but which, however, have shortcomings on the processing side) while, however, having a low degree of, or no adhesion with respect to cement mortar and which are responsible for trouble conditions because of electrostatic charging, to be simply fixed in position in the way desired by the later user of the plant, while taking into account the high price of labor at the present day. Such fixing in position is furthermore to be possible without damaging the environment and without any chance of such mechanically fixed tiles being broken off from the material in which they are bedded.

This is made surprisingly possible by the present invention, because (a) the back side of each tile is coated with an epoxy or polyester resin mixture with a curing agent, the resin mixture including fine sand together with fine quartz sand-based powder and a thixotropic substance and (b) the tiles of ceramic, fused mineral or metallic material so coated on the back side are placed on cement mortar, having, if necessary, additives.

In the process of the present invention, tiles based on ferrous materials, sintered or fused aluminum and/or zirconium oxide may be coated with the epoxy or polyester resin placed on the back side. This coating operation may be undertaken under good working conditions, for example in the works producing the tiles, in the open air or other desired conditions. Because shortcomings caused by poor adhesion and fixing in position are so well taken care of, it is then possible for the fixing in position to be undertaken using readily handled non-toxic cement mortar, with additives, and not on plastic cements based on epoxy or polyester resin, which are very much higher in price than cement mortar.

A useful effect may be produced by rolling in materials based on substances with an affinity for cement mortar on the back side of the coating.

A pointing compound based on epoxy resin, if electrically conducting, may furthermore be used for stopping any static charging of the wear-resistant or armoring tiles, on which point see the German Offenlegungsschrift specification No. 2,637,223.

More specially, using this pointing compound with high-strength plastic mortar compositions based on epoxy or polyester resin, the complete tile mortar structure is joined up as a network.

A useful effect may furthermore be produced by using, as a curing agent, an in-situ-adduct of an amine mixture such as 3-aminoethyl-3.5.5-trimethyl-cyclohexylamine and 2.2.4-trimethylhexamethyl diamine with a diphenylol-propane-diglycidylether.

For producing desired properties such as high strength, the coating consists of 100 parts by weight of resin mixture made of Kalfix epoxy resin: 36.9 parts by weight
fine sand: 25.2 parts by weight
quartz sand powder: 34.9 parts by weight
thixotropic agent: 1.0 parts by weight
conducting carbon stock: 2.0 parts by weight which is mixed up with 17 parts by weight of a curing agent.

On this coating, which is conducting, it is then possible for quartz sand for example with a grain size of 1 to 3 mm or Lavalite with a grain size of 1 to 3 mm or broken expanded clay with a grain size of 1 to 3 mm to be dusted and rolled in so that it is thoroughly mixed up with the coating without, however, inactivating the surface of the spread-on material.

The tiles, as fixed in the cement mortar, may be pointed, that is to say the spaces between them filled up, with a pointing compound, made conducting if necessary, and based on epoxy resin as noted, for producing a high strength of the structure.

The conducting pointing compound, while having the useful effect of being conducting, has the shortcoming of having a lower degree of adhesion. By using the pointing compound as put forward by the present invention, with high-strength plastic mortar compositions as based on epoxy or polyester resin, it becomes possible for the complete tile mortar structure to be joined up like a network without, at the same time, having the shortcomings of bedding or fixing the tiles on pure epoxy resin mortar.

On the one hand, the process of the invention makes do with very much smaller amounts of plastic cement, a product of the petroleum industry, while, on the other hand, is responsible for non-toxic and trouble-free ways of fixing the tiles in position, using simple, low-price fixing materials. For this reason, the epoxy or polyester resin is only needed for those parts acted upon by high forces or high wearing effects. Shortcomings on processing are put to an end and industrial hygiene is increased.

The working example now to be given will make the invention clearer without, however, limiting its scope and will make it clear how tiles having a face which is inactive with respect to cement mortar, may be conditioned for bedding in cement mortar and activated.

The example is with respect to highly wear-resistant armoring tiles for bedding in cement mortar.

Firstly, the back side of the tiles, which are to be coated and are made for example of high-strength steel, stainless steel, cast ferrous material, ceramic or fused mineral materials, is mechanically cleaned and freed of all oil and grease.

The tiles are then placed on a support with the back side to be coated facing upwards and coated with the plastic material mixture of the present invention. The coating is put in with a short-haired, broad, generally stiff brush with a coating thickness of 1.5 to 2 mm, it being important that the plastic coating be complete and worked into any small holes or pores in the tile back face or side.

Within a time of 20 minutes the so coated back side of the tiles is dusted and rolled in with a layer of round-grained quartz sand with a grain size of 2 to 3 mm or with Lavalite with a grain size of 2 to 3 mm, more material than is needed for fully covering the tiles being used. This quartz sand coating or layer is rolled in mechanically using a rubber-elastic roller with a pressure of 1 to 2 N/square mm.

For this operation the tile temperature has to be about 290° K., a good cure temperature for the coating being between 290° and 310° K.

After 8 to 10 hours the tiles may be stacked, with pieces of cardboard between them for stopping damage to the back sides which are to be fixed in the mortar.

The tiles with this coating may be fixed to a cement mortar composition, which, for getting the best effect, is best mixed with plastic material for producing the desired properties, that is to say increasing the water retention and, for this reason, the water cement factor so that the flexural strength is increased.

Such tiles, coated on the back side may have a shear strength of up to 1 to 2 N/square mm. Without a coating, such tiles would have shear strengths of under 0.5 N/square mm, something which is in no way in line with the needs of engineering design.

What is claimed is:

1. A process for fixing in position on a cement mortar coated supporting structure wear-resistant lining tiles of ceramic, fused mineral and metallic material for highly abrasive bulk material such as coal ores and rock, said process comprising:
    cleaning the back side to be coated of each of said tiles,
    applying an epoxy-containing coating to the cleaned back side of said tiles, said epoxy-containing coating having a thickness of 1.5–2 mm and consisting of a resin mixture and a curing agent mixed at a ratio of 100 to 17, the curing temperature for said epoxy-containing coating being in the range of 290–310 K.°,
    the resin mixture consisting of
        36.9 parts by weight epoxy resin,
        25.2 parts by weight of fine sand,
        34.9 parts by weight of quartz sand powder,
        1.0 parts by weight of thixotropic agent, and
        2.0 parts by weight of conducting carbon stock,
    dusting and rolling in the epoxy-containing coated back side of said tiles a layer of material having an affinity for cement mortar, the material being selected from the group consisting of quartz sand, lavalite and broken expanded clay, with a grain size of 1–3 mm,
    said material being rolled into the epoxy-containing coated back side of said tiles at a pressure of 1 to 2 N/square mm, and
    following the rolling in of said material, hardening said epoxy-containing coating, placing and fixing in position said coated tiles on the cement mortar coated supporting structure and filling up the spaces between said tiles by a pointing compound, so as to produce a high shear strength in said tiles.

2. The process as claimed in claim 1, further comprising applying a conducting epoxy-containing coating and working the coating into any small pores in the back side of the tiles so as to completely coat the same.

3. The process as claimed in claim 1, in which, within a time period of 20 minutes after applying the epoxy-containing coating to the back side of said tiles, dusting and rolling into the coated back side of said tiles, round-grained quartz sand having a grain size of 2 to 3 mm, and using more material than is needed for fully covering said tiles.

4. The process as claimed in claim 1, in which, within a time period of 20 minutes after applying the epoxy-containing coating to the back side of said tiles, dusting and rolling into the coated back side of said tiles, lavalite with a grain size of 2 to 3 mm, and using more material than is needed for fully covering said tiles.

5. The process as claimed in claim 1, in which said tiles are fixed to a cement mortar composition having plastic material additives that increase water retention, strength and adhesive properties of the mortar composition.

6. The process as claimed in claim 1, in which said epoxy-containing coating is conductive and said material is thoroughly mixed with said epoxy-containing coating, but without inactivating the surface of said epoxy-containing coating.

* * * * *